United States Patent
Adams et al.

[11] 3,972,588
[45] Aug. 3, 1976

[54] IMAGING METHOD

[75] Inventors: James E. Adams, Ontario; Gary A. Dir, Fairport; Werner E. L. Haas, Webster, all of N.Y.

[73] Assignee: Xerox Corporation, Stamford, Conn.

[22] Filed: Aug. 19, 1974

[21] Appl. No.: 498,799

[52] U.S. Cl. ............................................. 350/160 LC
[51] Int. Cl.² ........................................... G02F 1/13
[58] Field of Search ............ 350/160 LC; 340/324 R, 340/324 M

[56] References Cited
UNITED STATES PATENTS

| | | | |
|---|---|---|---|
| 3,642,348 | 2/1972 | Wysocki et al. | 350/160 LC |
| 3,806,230 | 4/1974 | Haas | 350/160 LC |

OTHER PUBLICATIONS

Melamed et al., *Applied Physics Letters*, vol. 16, No. 4, Feb., 1970, pp. 149–151.

*Primary Examiner*—Ronald J. Stern
*Attorney, Agent, or Firm*—James J. Ralabate; Michael H. Shanahan; George J. Cannon

[57] ABSTRACT

A liquid crystalline composition comprising an optically active material and a nematic liquid crystalline material having negative dielectric anisotropy and optionally an ionizable salt, and capable of undergoing the electrohydrodynamic induced transition from the Grandjean texture to the focal-conic texture, is initially provided in the Grandjean Texture. Current is passed through the liquid crystalline composition up to its region of maximum response to electrical stimulus. A second current is then passed through the liquid crystalline composition until at least a partial optical conversion is achieved in response to electrical stimulus of the liquid crystalline composition.

17 Claims, 4 Drawing Figures

IMAGING METHOD

BACKGROUND OF THE INVENTION

This invention relates to liquid crystalline imaging, and more particularly, to providing an electrohydrodynamic induced texture transformation from the Grandjean to focal-conic texture in liquid crystalline compositions.

Cholesteric liquid crystals are known to exhibit various observable textures. For example, cholesteric liquid crystals may adopt a homeotropic, a focal-conic, or a Grandjean plane texture as modifications of the cholesteric mesophase itself, as described in Gray, G.W., *Molecular Structure and the Properties of Liquid Crystals*, Acadamic Press, London, 1962, pp. 39–54.

U.S. Pat. No. 3,704,056 to J. J. Wysocki, J. E. Adams and R. W. Madrid discloses that the Grandjean texture of a cholesteric liquid crystalline material can be transformed into the focal-conic texture by application of an electrical field. The electrical field induced texture transformation is indicated therein as also occurring with liquid crystalline compositions comprising a cholesteric liquid crystalline material and a nematic liquid crystalline material.

It is known that the application of a D.C. electrical stimulus can cause a hydrodynamic effect converting an initially clear Grandjean texture to the scattering focal-conic texture.

In new and growing areas of technology such as liquid crystalline imaging, new methods, apparatus, compositions, and articles of manufacture are often discovered for the application of the new technology in a new mode. The present invention relates to a novel method of providing an electrohydrodynamic induced texture transition from the Grandjean to the focal-conic texture.

SUMMARY OF THE INVENTION

It is, therefore, an object of this invention to provide a novel imaging method.

It is another object of this invention to provide a novel method for providing an electrohydrodynamic induced texture transformation.

It is another object of this invention to provide a novel imaging method.

It is yet a further object of this invention to provide a novel method for imagewise providing an electrohydrodynamic induced texture transformation from the Grandjean to the focal-conic texture.

It is yet a further object of this invention to provide increased sensitivity to the imagewise transformation of the Grandjean texture to the focal-conic texture.

The foregoing objects and others are accomplished in accordance with this invention by providing a liquid crystalline composition comprising optically active material and a nematic liquid crystalline material having negative dielectric anisotropy, and optionally an ionizable salt, between two electrodes, said liquid crystalline composition capable of undergoing an electrohydrodynamic induced transformation from the Grandjean to the focal-conic texture; applying a voltage across said liquid crystalline composition at a voltage magnitude and for a period of time such that the voltage-time product is insufficient to initiate substantial texture transformation; subsequently applying a voltage of a magnitude and for a period of time such that the voltage-time product is sufficient to bring said liquid crystalline composition at least into its region of maximum response to electrical stimulus thereby causing substantial texture transformation.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein.

DESCRIPTION OF THE PREFERRED EMBODIMENTS

Figure 1:
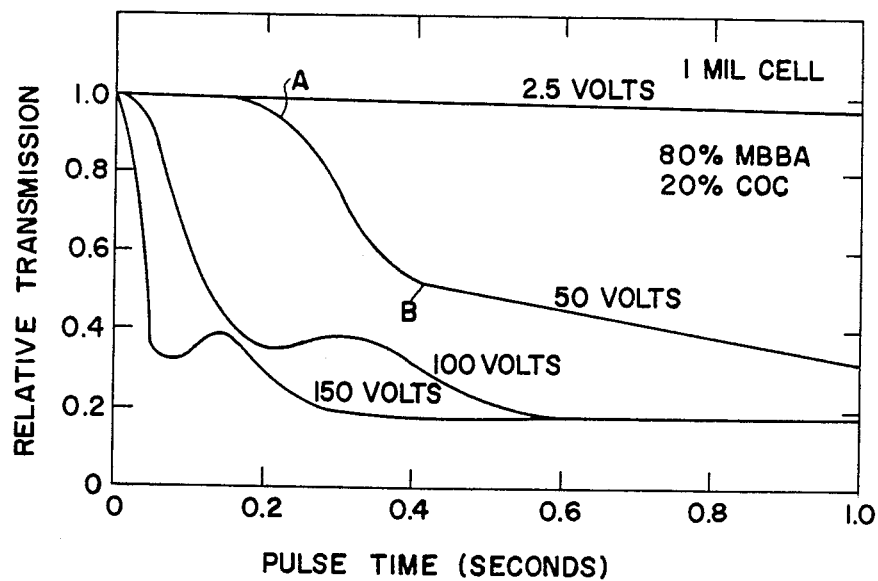
FIG. 1 is a graphic representation of the dependence of electrohydrodynamic induced texture transformation of an exemplary liquid crystalline composition upon the magnitude and time of application of voltage.

The exemplary composition in FIG. 1 is a liquid crystalline composition comprising about 80 weight percent MBBA (p-methoxybenzilidene-p-n-butylaniline) and about 20 percent by weight COC (cholesteryl oleyl carbonate). This liquid crystalline composition is exemplary of those which are capable of undergoing an electrohydrodynamic induced texture transformation from the Grandjean to the focal-conic texture. By "electrohydrodynamic induced texture transformation" is meant a texture transformation in which turbulent motion occurs. On the x-axis is plotted the pulse time of applied voltage, i.e., the duration of applied voltage. On the y-axis is plotted the relative transmission of white light through the liquid crystalline composition as detected by a Leitz microscope with an attached photodiode, at a numerical aperture of 0.1. Unity transmission (that is, the value of 0.1) is arbitrarily taken for the white light transmission through the liquid crystalline composition in the Grandjean texture. It has been experimentally determined that the relative transmission can be correlated to the amount of the liquid crystalline composition that has been transformed to the focal-conic texture from the Grandjean texture.

As can be seen from FIG. 1, liquid crystalline compositions capable of undergoing the electrohydrodynamic induced texture transformation from the Grandjean texture to the focalconic texture, of which the composition of FIG. 1 is exemplary, exhibit a region of maximum response to electrical stimulus. For example, as can be seen from the curve plotted for the application of 50 volts, the portion of the 50 volt curve between points A and B indicates the region of maximum response for the exemplary composition wherein greatest change in relative transmission occurs. Since change in relative transmission is indicative of change in the amount of the liquid crystalline composition undergoing the electrohydrodynamic induced texture transformation, the A to B portion of the 50 volt curve defined the region where the greatest amount of texture transformation occurs.

It has been found that the electrohydrodynamic induced texture transformation from the Grandjean to the focalconic texture is substantially additive. That is, on the 50 volt curve, one can reach point B by applying 50 volts for approximately 0.2 seconds, removing the voltage, and subsequently applying 50 volts for another 0.2 seconds at which time one is substantially at point B. The 50 volt curve is used for purposes of illustration only, and it will be understood that any curve of FIg. 1, whether depicted therein or not, which exhibits a region of maximum response can be utilized in accordance with the practice of the present invention. As a matter of practical convenience, applied voltage curves such as, for example, the 50 volt curve of FIG. 1 which are more or less in the shape of a reverse "S" are preferred. However, the invention can be practiced with any liquid crystalline composition capable of undergoing an electrohydrodynamic induced texture transformation from the Grandjean to the focal-conic texture. In FIG. 1, the lowest transmission of about 0.1 relative transmission is indicative of a fully transformed focalconic texture for the exemplary composition notes therein. It is apparent from FIG. 1 that the lower voltages require disproportionally longer times to achieve the fully transformed focal-conic texture. Thus, nonlinearity in voltage is a characteristic of the electrohydrodynamically induced texture transformation to the focal-conic texture from the Grandjean texture.

Figure 2:
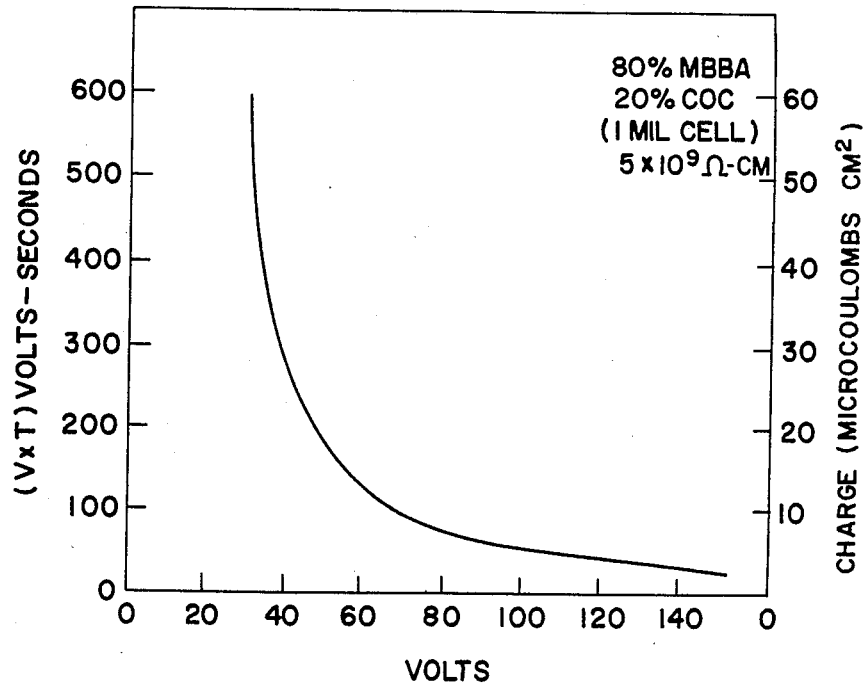
FIG. 2 is a graphicc representation of the dependency of complete electrohydrodynamic induced texture transformation of an exemplary liquid crystalline composition upon voltage and time.

The transformation nonlinearity between voltage and time has also been found through experimentation to apply to current and time. This nonlinearity in voltage and current can be represented in the form of a reciprocity relationship of electrical stimulus and time. FIG. 2 is a plot of this relationship for the complete Grandjean-focal-conic transformation. The abscissa chosen is the applied voltage. The voltage-time product to complete the transformation from Grandjean to focal-conic texture is shown on the left ordinate and the current-time product (or change) on the right ordinate. If the transformation were a linear process, a straight horizontal line would be obtained. However, as seen from FIG. 2, the transformation is not a linear process. FIG. 2 shows that high voltages and high currents require disproportionally less time to achieve a transformation. Indeed, it has been found through experimentation that the magnitude of applied voltage and the time during which it is applied has a characteristic relationship of $E^2 \times t$ where E is the electrical field strength across the liquid crystalline composition resulting from the application of voltage and t is the duration of voltage application. It has been found through experimentation that $E^2 \times t$ is characteristically of constant value for complete electrohydrodynamically induced texture transformation for a particular liquid crystalline composition suitable for use in the practice of this invention.

The parameter $E^2 \times t$ characteristically has a different value for each of the different liquid crystalline compositions suitable for use in the practice of this invention. It should be noted that the exemplary liquid crystalline composition for which FIGS. 1 and 2 are plotted had a layer thickness of about 1 mil. Accordingly, the electrical field strength across the liquid crystalline composition layer is, in volts per mil, of the same magnitude as the voltages denoted in FIGs. 1 and 2.

The relationship of applied voltage and time and total current and time for electrohydrodynamically induced texture transitions to the focal-conic from the Grandjean texture is indeed surprising and unexpected. Moreover, this discovery together with the substantially additive effect previously mentioned allows one to sensitize the liquid crystalline composition prior to causing texture transformation. This will become more evident as the discussion proceeds.

Figure 3:
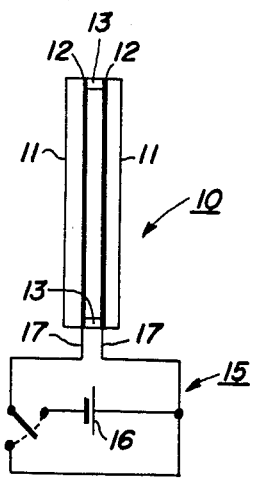
FIG. 3 is a schematic illustration of one embodiment of the invention.

In FIG. 3, a typical liquid cystalline imaging member 10, sometimes referred to as an electroded imaging sandwich, is shown in partially schematic cross-section where a pair of transparent plates 11 having substantially conductive coating 12 upon the contact surface, comprise a parallel pair of substantially transparent electrodes. An imaging member wherein both electrodes are transparent is preferred where the imaging member is to be viewed using transmitted light; however, a liquid crystalline imaging member may also be viewed using reflected light thereby requiring only a single transparent electrode while the other may be opaque. The transparent electrodes are separated by spacing member 13 which contains voids which form one or more shallow cups which contain the liquid crystalline composition layer which comprises the active element of the imaging member. A voltage is applied between the electrodes by an external circuit 15 which typically comprises a source of potential 16 which is connected across the two electrodes through leads 17. The circuit 15 may also contain suitable switching means. The potential source may be either D.C., A.C. or a combination thereof.

In the liquid crystal imaging member described in FIG. 3 the electrodes may be of any suitable transparent conductive material. Typical suitable transparent conductive electrodes include glass or plastic substrates having substantially transparent and continuously conductive coatings of conductors such as tin; indium oxide, indium, aluminum, chromium, tin oxide, or any other suitable conductor. These substantially transparent conductive coatings are typically evaporated onto the more insulating, transparent substrate. NESA glass, a tin oxide coated glass manufactured by the Pittsburgh Plate Glass Company, is a commercially available example of a typical transparent, conductive electrode material.

The spacer, 13 in FIG. 3, which separates the transparent electrodes and contains the liquid crystal film between said electrodes, is typically chemically inert, transparent, substantially insulating and has appropriate dielectric characteristics. Material suitable for use as insulating spacers include cellulose acetate, cellulose triacetate, cellulose acetate butyrate, poly urethane elastomers, polyethylene, polypropylene, polyesters, polystyrene, polycarbonates, polyvinyl fluoride, polytetrafluoroethylene, polyethylene terephthalate, and mixtures thereof.

Such spacers, which also approximately define the thickness of the imaging layer or film of liquid crystals, are preferably of a thickness in the range of about $100\mu$ or less. Preferred results are typically attained with spacers in the thickness range between about $1\mu$ and about $100\mu$.

Layer 14 of the liquid crystalline composition may comprise any suitable liquid crystalline composition capable of undergoing an electrohydrodynamic induced texture transformation from the Grandjean texture to the focal-conic texture. Typical suitable liquid crystalline compositions comprise an optically acrive material and a nematic liquid crystalline material, and, optionally, an ionizable salt.

Typical suitable optically active materials include non-mesomorphic optically active materials and mesomorphic optically active materials. Typical suitable non-mesomorphic optically active materials include: derivatives of alcohols such as 1-methol, 1-linanool, d-mannitol, d-borneol and d-quercitol; derivatives of ketones such as d-camphor, d-3-methylcyclohexanone, 1-methone and 1-6-isopropyl-3-cyclohexanone; derivatives of carboxylic acid, 1-campholic acid, 1-arabonic acid, d-tartaric acid, and 1-ascorbic acid; derivatives of aldehydes such as d-citronellal; derivatives of alkenes such as 1-B-pinane, d-silvesterene, and d-linonene; derivatives of amines such as 1-2-methylpiperidine; derivatives of nitriles such as d-mandelonitrile; derivatives of amides such as d-hydrocarbamide; and mixtures thereof.

Mixtures of the nematic liquid crystalline substance and the optically active, non-mesomorphic material can be prepared in organic solvents such as chloroform, petroleum ether, methylethyl ketone and the like, which are typically subsequently evaporated from the mixture thereby leaving the liquid crystalline composition. Alternatively, the individual components of the liquid crystalline composition can be combined directly by heating the mixed components to a temperature which is above the isotropic transition temperature of the nematic liquid crystalline substance and the melting point of the non-mesomorphic material.

Typical suitable mesomorphic optically active materials include liquid crystalline optically active materials such as cholesteric liquid crystalline materials. Typical suitable cholesteric liquid crystalline materials include derivatives from reactions of cholesterol and inorganic acids; for example, cholesteryl chloride, cholesteryl bromide, cholesteryl iodide, cholesteryl nitrate, esters derived from reactions of cholesterol and carboxylic acids; for example cholesteryl crotonate; cholesteryl nonanoate; cholesteryl hexanoate; cholesteryl formate; cholesteryl chloroformate; cholesteryl propionate; cholesteryl acetate, cholesteryl valerate; cholesteryl linolate; cholesteryl linolenate; cholesteryl oleate; cholesteryl erucate; cholesteryl butyrate; cholesteryl caprate; cholesteryl laurate; cholesteryl myristate; ethers of cholesterol such as cholesteryl decyl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl heptyl carbamate; and alkyl amides and aliphatic secondary amines derived from $3\beta$-amino-$\Delta^5$-cholestene and mixtures thereof; peptides such as poly-$\gamma$-benzyl-l-glutamate; derivatives of beta sitosterol such as sitosterol chloride; and active amyl ester of cyano benzylidene amino cinnamate. The alkyl groups in said compounds are typically saturated or unsaturated fatty acids, or alcohols, having less than about 25 carbon atoms and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

The liquid crystal imaging layers or films are preferably of a thickness in the range of about 1 to about 100$\mu$. Optimum results are typically attained with layers in the range of thicknesses between about ¼ mil and about 5 mils.

Typical suitable nematics having negative dielectric anisotropy include N-(p-Methoxybenzilidene)-p-butylaniline (MBBA); p-azoxyanizole (PAA), N-(p-Ethoxybenzilidene)-p-butylaniline (EBBA); dl-4-(2-methylhexyl)-4'-ethoxy-$\alpha$-chloro-trans-stilbene; p-methoxybenzilidene-p'-aminophenyl-3-methyl valerate (MBV); p-ethoxybenzilidene-p'-aminophenyl-3-methyl valerate; pp'-methoxypentyltolane (MPT); pp'-propoxyheptyltolane (PHT); pp'-dioctoxytolane (DOT), trans-4-butyl-$\alpha$-chloro-4'-ethoxystilbene and phase IV and phase V of nematic liquid crystalline phases available under the trademark Licristal from EM Laboratories, Inc. Phase IV is a eutectic mixture of

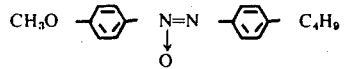

and

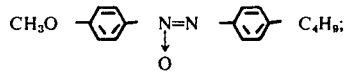

phase V is a mixture of

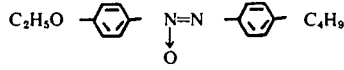

and

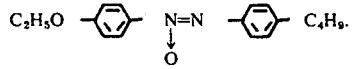

With highly resistive compositions, optionally ionizable salts may be added to the liquid crystalline composition to enhance conductivity in order to provide current flot. Typical additives include tetraethyl ammonium bromide, tetramethyl ammonium chloride, tetra-n-butyl ammonium chloride and tetramethyl ammonium perchlorate.

Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystals of the liquid crystalline mixture can be combined directly by heating the mixed components above the isotropic transition temperature.

In accordance with the practice of the present invention, the liquid crystalline composition layer 14 of FIG. 3 is first provided with a voltage thereacross of a magnitude and for a duration sufficient to partially transform layer 14 from the Grandjean to the focal-conic texture. By "partially transformed" is meant that the region of maximum response to electrical stimulus of the liquid crystalline composition of layer 14 is approached. Preferably, but not necessarily, the partial transformation is up to about the region of maximum response to electrical stimulus. Subsequent to the partial transformation step, a voltage is applied of magnitude and for a duration sufficient to transform the liquid crystalline composition of layer 14 to a point at least within the region of maximum response to electrical stimulus and, preferably, to the point of complete transformation to the focal-conic texture.

In operation, the imaging sandwich of FIG. 1 can be utilized to provide the initial partial transformation step by a uniform application of voltage between the two electrods. Subsequently, the further transformation step to either within the region of maximum response to electrical stimulus or to complete focal-conic texture transformation can be created in imagewise configuration by applying the subsequent voltage in imagewise configuration. Alternatively, the subsequent voltage could be applied uniformly wherein the subsequent transformation is uniform and not in imagewise configuration. Typically, the application of imagewise configured voltage in the subsequent transformation is carried out by utilizing at least one shaped electrode, shaped in imagewise configuration, in the FIG. 1 embodiment. As will be seen, below, in connection with the description of FIG. 4, a more versatile imaging method is provided by the incorporation of a photoconductive layer in the FIG. 1 embodiment wherein the application of voltage across the layer of liquid crystalline composition is optically controlled.

The Grandjean texture is typically charaterized by reflective dispersion of incident light around a wavelength $\lambda_o$ (where $\lambda_o = 2np$ where $n = $ the index of refraction of the liquid crystalline film and $p = $ the pitch of the liquid crystalline film) and optical activity for wavelengths of incident light away from $\lambda_o$. If $\lambda_o$ is in the visible spectrum for normal incidence and normal viewing, the liquid crystalline film appears to have the color corresponding to $\lambda_o$, and if $\lambda_o$ is outside the visible spectrum the film appears colorless and non-scattering. The Grandjean texture is sometimes referred to as the "disturbed" texture.

The focal-conic texture is also typically characterized by reflective dispersion but in addition this texture also exhibits diffuse scattering in the visible spectrum, whether $\lambda_o$ is in the visible spectrum or not. The appearance of the focal-conic texture state is typically milky-white when $\lambda_o$ is for outside the visible spectrum. The focal-conic texture of cholesteric liquid crystals is sometimes referred to as the "undisturbed" texture.

For example, in the inventive system when cholesteric liquid crystals are placed in the electrode sandwich in the Grandjean texture, they initially appear colored, or colorless and transparent. If the electrode sandwich is observed between polarizers, the imaging sandwich appears colored or black. When the voltage is placed across the liquid crystalline film, the texture change is observable because the liquid crystalline film becomes white in the image area when the imaging sandwich is observed in transmitted or reflected light. The described imaging system thereby produces a white image on a dark or colored background. However, it is clear that the liquid crystal imaging sandwich may be used to create the desired image, with or without the use of polarizers or other image enhancing devices.

Figure 4:
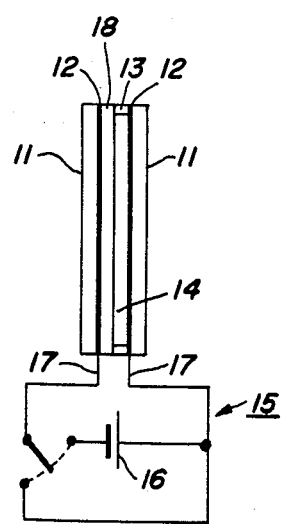
FIG. 4 is a schematic illustration of another embodiment of the invention.

FIG. 4 illustrates another embodiment of the invention, particularly suited for optically addressing or imaging the liquid crystalline composition layer 14. In FIG. 4, like numerals refer to like parts of FIG. 3. The only additional aspect of FIG. 4 is the photoconductive layer 18. Photoconductive layer 18 may comprise any suitable photoconductive material. Typical suitable photoconductive materials include photoconductive inorganic materials and photoconductive organic materials. Typical suitable inorganic photoconductive materials include sensitized zinc oxide, for example, sensitized by the addition of Rhodamine dye, available from Dupont, selenium, selenium alloy with arsenic such as, for example, arsenic triselenide, tellurium, tellurium antimony or bismuth; cadmium sulfide, cadmium sulfoselenide, and the many other typical suitable inorganic photoconductive materials listed in U.S. Pat. No. 3,121,006 to Middleton et al and listed in U.S. Pat. No. 3,288,603, both of which patents are hereby incorporated by reference. Typical suitable organic photoconductive materials include, for example, a combination of 2,5-bis(p-aminophenyl)-1,3,4-oxadiazole available under the trademark TO 1920 from Kalle and Co., Weisbaden-Biebrich, Germany and Vinylite VYNS, a copolymer of vinyl chloride and vinyl acetate, available from Carbide and Carbon Chemicals Company; and the combination of 2,4,7-trinitro-9-fluorenone to polyvinyl carbazole, available under the trademark Luvican 170 from Winter, Wolf and Company, New York, New York. The thickness of the photoconductive layer is not critical to the practice of the invention and any thickness which provides a sufficiently high dark resistance ma be utilized. That is, the dark resistance should be sufficient to provide greater voltage across the photoconductive layer than across the liquid crystal layer in the dark. When struck by actinic radiation, the voltage decreases across the photoconductive layer and increases across the liquid crystalline layer 14. It will be appreciated that photoconductors having a fundamental absorption band within the electromagnetic spectrum, including the visible region, the x-ray region, the ultra-violet region, the infrared region, etc., can be employed. The radiation used will, of course, be radiation which is actinic to the photoconductor employed.

The method provided by the practice of the present invention will be appreciated to be of significance, especially in imaging embodiments thereof where the imagewise configured transformation is to take place under conditions of limited imagewise configured stimulus. That is, with respect to the embodiment of FIG. 1, the imagewise applied voltage across liquid crystalline composition layer 14 may be from a source of either limited magnitude or limited duration; similarly, in the embodiment of FIG. 4, the imagewise configured optical input may be from a source having a limited optical intensity such as, for example, a cathode ray tube.

In optically imaging the embodiment of FIG. 4, the partial transformation step to a point prior to, and preferably up to about the region of maximum response to electrical stimulus, is carried out by either uniformly or in imagewise configuration impinging the photoconductive layer with radiation actinic thereto while a voltage is applied across the imaging sandwich. Similarly the subsequent transformation step in the embodiment of FIG. 4 is carried out with radiation which is actinic to the photoconductor and which may impinge the photoconductor either uniformly or in imageiwse configuration. It will be appreciated, of course, that the optical address in one step is uniform and in the other step imagewise, or vice versa, in the imaging mode. Of course, when the optical address in both steps is carried out with radiation uniformly impinging the photoconductor, then the liquid crystalline composition layer 14 will uniformly transform to the extent desired.

Of noteworthy significance in the practice of the present invention according to the optical address imaging embodiment of the sandwich structure in FIG. 4 is the fact that the sandwich structure can be sensitized or partially transformed prior to being exposed to the optical output of a cathode ray tube. Subsequently, when exposed to the optical output of a cathode ray tube the sensitized structure will sufficiently transform to provide an image corresponding to the cathode ray tube optical output and of sufficient contrast from the previously transformed background areas so as to be distinguishable therefrom. Preferably, the exposure to the optical output of the cathode ray tube is sufficient to provide complete transformation to the focal-conic texture. This is typically occur when care is taken to sensitize the structure by partially transforming up to about the region of maximum response to electrical stimulus.

The following Examples further specifically illustrate various preferred embodiments of the present invention. Parts and percentages are by weight unless otherwise indicated.

EXAMPLE I

An imaging member according to FIG. 3 is prepared as follows. An about 1 mil thick Mylar spacer is sandwiched between two tin-oxide coated glass electrodes and filled by capillary action with a liquid crystalline composition comprising by weight about 80% MBBA and about 20% cholesteryl oleyl carbonate. The liquid crystalline compositions assume the Grandjean texture. The imaging member is illuminated with a Spectra Physics 162 Argon ion laser. Light transmitted through the imaging member was detected with an E.G. and G. SGD-100 photodiode having an active area of about 0.05 cm$^2$ and located relative to the imaging member such that the resulting numerical aperture was about 0.006. Since the amount of transmitted light detected varies with varying numerical aperture values, this numerical aperture value of about 0.006 was utilized throughout all of the Examples.

The electrodes are electrically connected to a pulsed D.C. voltage source.

A first pulse of an amplitude of about 60 volts and duration of about 0.34 seconds was applied. The transmitted light detected subsequent to the pulse is observed to be about 21% less than the transmitted light detected initially (prior to voltage application) which initial transiitted light is taken as unity. The member is driven back to its initial unity transmission level by applying about 400 volts peak to peak A.C. voltage for about 7 seconds at about 3 KHz.

A second pulse of an amplitude of about 100 volts and duration of about 0.125 seconds is applied. The transmitted light detected subsequent to the second pulse is observed to be about 12% less than the initial unity transmission level. The member is again driven back to its initial unity transmission level. Decreases in transmission are correlated to transformation from the Grandjean to the focal-conic texture. Then, the first and second pulses previously described are applied sequentially without an intervening return to the initial unity transmission level. The second pulse is applied about 0.1 second after the first pulse terminates. This sequence of pulses results in a decrease of transmission of about 78% from the initial unity transmission level.

When the second pulse is in imagewise configuration and applied sequentially to the uniform application of the first pulse the image area of the member undergo the 78% decrase of transmission while the background areas undergo the 21% decrease of transmission.

It is noteworthy that the first voltage pulse obviously sensitized the imaging member and provided, upon second voltage pulse application, a greater transmission decrease than results from either the first or second pulse above, or the mere addition of the first and second pulse transmission decreases. Thus, the sequential application of the first and second voltage pulses provide a synergetic effect in transforming the Grandjean texture to the focal-conic texture.

EXAMPLE II

Example I is repeated except that the first voltage pulse is 50 volts for about 0.32 seconds, the second voltage pulse is about 100 volts for about 0.05 seconds.

The separate application of the first voltage pulse results in a transmission decrease of about 16% and the second voltage pulse results in a transmission decrease of about 10%.

The sequential application of voltage pulses in Example I is followed except that the second pulse immediately follows the first pulse without the 0.1 second time delay. The resulting transmission decrease is observed to be about 50% from the initial unity transmission.

It will be appreciated that other variations and modifications will occur to those skilled in the art upon a reading of the present disclosure. These are intended to be within the scope of this invention.

For example, any of numerous cell electrode configurations that allow selective addressing of the liquid crystalline material may be utilized, such as the so-called matrix or cross grid electrode configuration, where non-optical input is provided.

What is claimed is:

1. A method for transforming a liquid crystalline composition, comprising:
    a. providing in the Grandjean texture between two electrodes a liquid crystalline composition comprising an optically active material and a nematic liquid crystalline material having dielectric negative anisotropy, said liquid crystalline composition capable of undergoing an electrohydrodynamic induced transformation to the focal-conic texture;
    b. applying a first electrical field across said composition of a magnitude and for a duration of time sufficient to provide a first electrohydrodynamic induced transformation; and, without erasure of said first transformation,
    c. removing said first electrial field and within about 0.1 second after said removal, applying a second electrical field across said composition of greater magnitude than said first electrical field and for a duration of time sufficient to provide further electrohydrodynamic induced texture transformation of said liquid crystalline composition; wherein the extent of said further transformation is substantially greater than the sum of separately achievable transformations by said first and second electrical field applications with intervening erasure.

2. The method of claim 1 further including a photoconductive layer sandwiched between said layer of liquid crystalline composition and one of said electrodes.

3. The method of claim 2 wherein said transparent electrodes are transparent to radiation actinic to said photoconductive layer, further including in step (b) and step (c) impinging said photoconductive layer with radiation actinic thereto whereupon said first and second electrical fields are applied across said layer of liquid crystalline commposition.

4. The method of claim 3 wherein the actinic radiation impinging said photoconductive layer during step (c) is provided by a cathode ray tube.

5. The emthod of claim 4 wherein said cathode ray tube actinic radiation is in imagewise configuration.

6. The method of claim 1 wherein said first electrical field is in imagewise configuration.

7. The method of claim 1 wherein said second electrical filed is in imagewise configuration.

8. The method of claim 1 wherein said liquid crystalline composition layer has a thickness of from about 1 to about 100 microns.

9. The method of claim 2 wherein said photoconductive layer has a thickness of from about 1 to about 100 microns.

10. The method of claim 1 wherein said liquid crystalline composition comprises about 80% by weight N(p-methoxybenzilidene)-p-butylaniline and about 20 weight percent cholesteryl oleyl carbonate.

11. The method of claim 1 wherein said optically active material comprises a non-mesomorphic material.

12. The method of claim 1 wherein said optically active material comprises a mesomorphic material.

13. The method of claim 12 wherein said mesomorphic optically active material comprises a cholesteric liquid crystalline material.

14. The method of claim 1 wherein said liquid crystalline composition further comprises an ionizable salt.

15. The method of clain 14 wherein said ionizable salt is selected from the group consisting of tetraethyl ammonium chloride, tetra-n-butyl ammonium chloride and tetraethyl ammonium perchlorate.

16. The method of claim 3 wherin in one of step (b) and step (c) said actinic radiation uniformly impinges said photoconductive layer and in the other of step (b) and step (c) said actinic radiation is in imagewise configuration.

17. The method of claim 5 wherein said actinic radiation in step (b) uniformly impinges said photoconductive layer.

* * * * *